US005979158A

United States Patent [19]
Kaiser et al.

[11] Patent Number: 5,979,158
[45] Date of Patent: Nov. 9, 1999

[54] METHOD OF OPERATING AN INTERNAL COMBUSTION ENGINE PLANT

[75] Inventors: Thomas Kaiser, Ostfildern; Martin Matt, Bruchsal, both of Germany

[73] Assignee: Daimler Chrysler AG, Stuttgart, Germany

[21] Appl. No.: 09/022,921

[22] Filed: Feb. 12, 1998

[30] Foreign Application Priority Data

Feb. 15, 1997 [DE]  Germany ............................ 197 05 865

[51] Int. Cl.⁶ .................................................. F01N 3/00
[52] U.S. Cl. ................................ 60/274; 60/284; 60/300; 123/179.3; 123/179.5
[58] Field of Search ............................ 60/284, 300, 274; 123/179.1, 179.3, 179.5, 179.16

[56] References Cited

U.S. PATENT DOCUMENTS

| | | | |
|---|---|---|---|
| 3,886,810 | 6/1975 | Sugiyama et al. ........................ 74/751 |
| 4,512,316 | 4/1985 | Mochizuki ............................... 123/478 |
| 4,626,696 | 12/1986 | Maucher et al. ...................... 123/179.5 |
| 5,163,290 | 11/1992 | Kinnear ..................................... 60/300 |
| 5,219,397 | 6/1993 | Jones ..................................... 123/179.3 |

FOREIGN PATENT DOCUMENTS

| | | |
|---|---|---|
| 41 43 904 | 7/1992 | Germany . |
| 43 39 686 | 11/1994 | Germany . |
| 43 29 448 | 3/1995 | Germany . |
| 195 32 325 | 9/1996 | Germany . |
| 196 00 975 | 2/1997 | Germany . |

*Primary Examiner*—Thomas Denion
*Attorney, Agent, or Firm*—Klaus J. Bach

[57] ABSTRACT

In a method of operating an internal combustion engine particularly a motor vehicle internal combustion engine, wherein the engine is driven, during an engine start-up procedure, to a predetermined engine activation speed and fuel injection is activated, after the engine has reached the engine activation speed, only after a delay period at least one second after activation of the ignition system.

7 Claims, 3 Drawing Sheets

METHOD OF OPERATING AN INTERNAL COMBUSTION ENGINE PLANT

BACKGROUND OF THE INVENTION

The invention relates to a method of operating an internal combustion engine plant. The invention is particularly suitable for optimizing engine operation during the start-up period so as to achieve the lowest possible noxious emissions. The invention is also especially suitable for internal combustion engine plants which are part of a hybrid drive as it may be used for example in motor vehicles.

In conventional starting procedures, the internal combustion engine is driven to a predetermined low speed far under engine idling speed whereupon ignition and fuel injection are activated at the same time. The engine is driven for example by an electric starter motor utilizing the energy of an on-board battery of the vehicle or, in the case of a hybrid drive, by the energy stored in an energy storage device, such as a flywheel or a traction battery, during a previous operating cycle of the engine.

In order to reduce noxious emissions specifically during engine startups, the use of exhaust gas catalytic converters is known which are heated electrically or by additional fuel combustion in the exhaust gas system of the internal combustion engine, see for example patent publication DE 43 39 686 C1 and the magazine publication "Heated Catalytic Converter" in Automotive Engineering, September 1994, page 31. By being actively heated such exhaust gas catalytic converters reach the operating temperature required for the conversion of pollutants sooner, particularly for the oxidation of carbon monoxide and unburnt hydrocarbons. As a result, noxious emissions are reduced early during warm-up of the engine.

DE 195 32 325 C1 discloses an internal combustion engine of a series hybrid drive which is driven for start-up to a speed higher than its normal start-up speed. Preferably, at the same time, fuel is admitted to the engine already before the start up speed is reached and is ignited so that the engine speed is rapidly increased under full load conditions.

DOS 196 00 975 A1 discloses a control arrangement for a four cycle internal combustion engine wherein, during engine start-up, the fuel injection is not activated before the ignition is activated, but is activated immediately afterwards or preferably delayed by a fraction of the engine operating cycle or by a predetermined number of ignition cycles. In this way, back firing into the intake passages during start up of the engine is to be avoided.

It is the object of the present invention to provide a method of operating an internal combustion engine plant in such a way that a low noxious emission level can be achieved already during the engine start-up phase.

SUMMARY OF THE INVENTION

In a method of operating an internal combustion engine particularly for motor vehicles, wherein the engine is driven, during an engine start-up procedure to a predetermined engine activation speed, fuel injection is activated after the engine has reached the engine activation speed and only after a delay period of at least one second after activation of the ignition system.

It has been found that with such a starting procedure, the hydrocarbon raw emissions of the internal combustion engine are lower than with conventional engine start-up procedures, wherein the internal combustion engine is activated at a much lower speed and ignition and fuel injection are initiated at the same time.

It further has been found that it is advantageous for minimizing noxious emissions during engine start-up, if the speed at which engine operation is activated is at least as high as the engine idle speed. To make this possible, a suitable starter motor may be used or, in the case of a hybrid drive, the energy storage device of the hybrid drive such as a flywheel or a drive battery with a high storage capacity in combination with an electric motor may be used for driving the engine wherein the electric motor becomes a generator after startup of the engine.

The ignition is activated at a certain point in time while the engine is brought up to speed that is during engine speed up, when the engine speed has reached a predetermined ignition activation value which is below the predetermined engine speed up to which the engine is driven during the startup procedure.

Preferably, the engine throttle valve is opened during the start-up procedure such that it is in a predetermined start-up position at the point in time when the fuel injection is activated.

In a startup procedure suitable for hybrid drives, the internal combustion engine is brought up to speed during engine start-up by energy which has been generated during a previous operating cycle of the engine and which has been stored in an energy storage device of the hybrid drive such as a flywheel or a battery with a high storage capacity. Then relatively longer engine speed-up periods and high engine speeds for startup can be realized without problems.

If the internal combustion engine plant further includes a heatable exhaust gas catalytic converter, the catalytic converter is first heated, in a preconditioning phase, to a predetermined minimum temperature before the engine is brought up to speed. When then, at a later point in time, the ignition is switched on and the fuel is injected the exhaust gas catalytic converter has already reached a temperature sufficiently high for the conversion of the noxious engine emissions so that the exhaust gas leaving the catalytic converter has the same low noxious emission concentration during the engine start-up phase as it has during normal engine operation after engine warm-up.

In a particular embodiment of the invention, the fuel injection is deactivated before the engine is shut down and the ignition is switched off and, if present, the throttle valve is closed only after a predetermined shut down delay period. With this measure, the internal combustion engine, specifically its intake system, is brought to predetermined resting state from which the engine can be restarted following the procedure according to the invention.

Preferred embodiments of the invention will be described below on the basis of the accompanying drawings.

DESCRIPTION OF PREFERRED EMBODIMENTS

Figure 1:
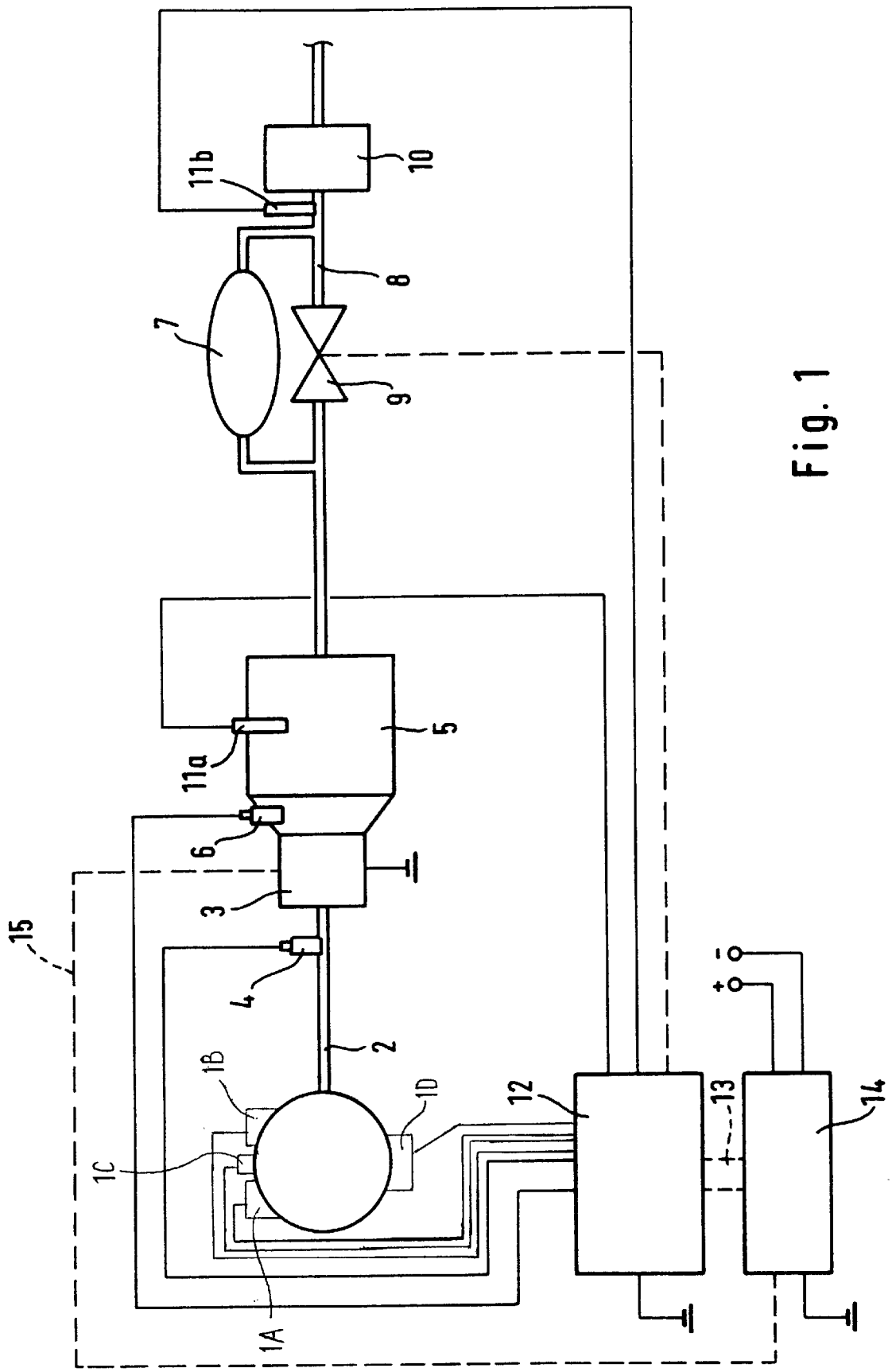
FIG. 1 shows schematically an internal combustion engine plant which can be operated in accordance with the method of the invention.

FIG. 1 is a schematic presentation of an internal combustion engine plant for a motor vehicle which may be part of a hybrid drive. The engine 1 is of conventional design; it includes an ignition system 1A, a fuel injection system 1B and a throttle valve 1C for the admission of air to the internal combustion engine, but otherwise there are only control system modifications which permit the internal combustion engine to be operated in accordance with the inventive method. The plant comprises an internal combustion engine 1 with an exhaust gas duct 2 (with large volume engines, there may by be several parallel exhaust gas ducts). Each exhaust gas duct 2 includes an electrically heatable catalytic converter 3 arranged in the proximity of the engine and a lambda sensor 4 mounted on the exhaust duct upstream of the catalytic converter 3. Downstream of the electrically heatable catalytic converter 3 and adjacent thereto, there is arranged a main catalytic converter 5 with a diagnostic sensor 6 arranged at its upstream end. Downstream of the main catalytic converter each exhaust duct includes an adsorber 7 for the adsorption of nitrogen oxide and/or hydrocarbons. As shown in FIG. 1, an optional bypass line 8 may be provided with a bypass valve 9 so that the exhaust gases can be conducted selectively through the adsorber 7 or through the bypass line 8. Downstream of the adsorber 7, the exhaust duct includes an exhaust catalytic converter 10 for the conversion of the nitrogen oxides and/or hydrocarbons stored in the adsorber 7 and released during desorption. The exhaust catalytic converter 10 and the electrically heatable catalytic converter 3 are typically of a substantially smaller volume, for example, 0.5 l, than the main catalytic converter 5 which has a volume of for example 2 l. The main catalytic converter and also the exhaust duct section just upstream of the exhaust catalytic converter 10 each include a temperature sensor 11a, 11b.

For the control of the internal combustion engine plant, a central engine control unit 12 is utilized to which particularly the output signals of the lambda sensor 4, the diagnostic sensor 6 and the temperature sensors 11a, 11b are supplied. The arrangement is controlled, where not described otherwise, in a conventional manner by the engine control unit 12 by way of control lines which extend from the control unit 12 to the various components. If the system includes an adsorber by-pass line 8, the engine control unit 12 also controls the bypass valve 9 by way of a control path shown in FIG. 1 as a dashed line. For the control of the heating of the electrically heatable exhaust gas catalytic converter 3, a heating control apparatus 14 is provided to which a suitable heating voltage is supplied and which includes a power switch by which the electric poser supply to the catalytic converter through the heater line 15 can be selectively established or interrupted. The heater control apparatus 14 and the engine control unit 12 are in data transmission communication with each other by way of a data transmission line 13.

It is quite apparent that, in addition to the components shown, the internal combustion engine plant may include various additional components depending on the applications. The internal combustion engine may for example be a part of a conventional hybrid drive unit provided with a startup motor 1D which is controlled by the engine control unit 12 as indicated schematically in FIG. 1. It is used to speed the engine up during starting to a relatively high speed in a particular way as will be described below. A start up motor, a special starter motor or, with a hybrid drive unit, a flywheel or an electrodynamic machine which can be used as an electric motor for engine start-up but which serves otherwise as an engine-driven generator.

Figure 2:
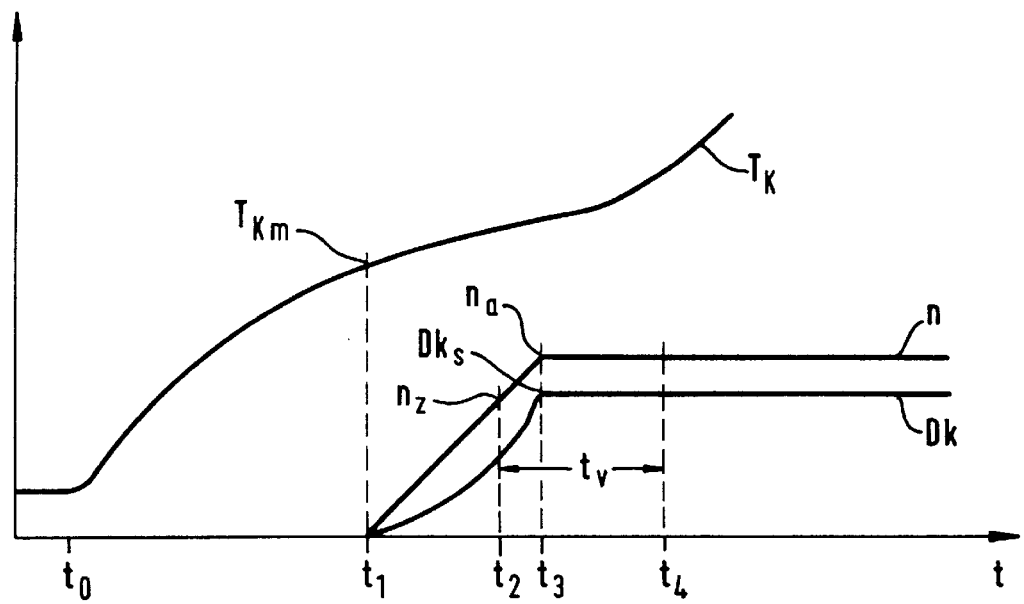
FIG. 2 shows schematically the engine start up procedure in accordance with the invention.

The internal combustion engine plant as shown in an exemplary manner in FIG. 1 can be operated with the method according to the invention. Specifically, the internal combustion engine 1 can be started in such a way that the level of noxious emissions is very low already during start-up operation. A start-up procedure which is part of the operating method of the internal combustion engine plant of FIG. 1 or of another suitably designed internal combustion engine plant is illustrated diagrammatically in FIG. 2. The FIG. 2 diagram shows three characteristic curves depending on the time t during a start-up procedure of the internal combustion engine 1. FIG. 2 shows qualitatively, depending on time, the temperature $T_K$ of the electrically heatable catalytic converter 3, the engine speed n and the throttle valve flap opening angle Dk. It is assumed in FIG. 2 that at a point in time $t_0$ an engine start-up is initiated by the operator. Following such a requirement a preconditioning procedure is performed, wherein the electrically heatable catalytic converter 3 is energized to be heated up. At this point, the engine remains at rest and the ignition and fuel injection systems remain deactivated and the throttle valve remains closed. To initiate the heating process, the central engine control unit 12 supplies a corresponding control signal, by way of the connecting line 13, to the heater control unit 14, which energizes the heater of the electrically heatable catalytic converter 3 by closing the power switch. At the same time, the sensor heater of the lambda sensor 4 is activated in order to bring the sensor 4 up to operating temperature.

The preconditioning phase is terminated at the point $t_1$ when the heatable catalytic converter 3 has reached a predetermined minimum temperature $T_{Km}$ at which it can effectively fulfill its purpose that is to convert noxious emissions. At this point in time $t_1$ rotation of the internal combustion engine 1 by the drive means provided for that purpose is initiated. At the same time, the throttle valve flap is being opened and a fuel pump for supplying fuel from the fuel tank to the injection valves is switched on. In contrast, however, to conventional start-up procedures in which the internal combustion engine is brought to a start-up speed which his far below the idle speed of the engine, for example, 150 rpm, with the method utilized with the invention, the engine is brought up to a much higher speed preferably in the order of the engine idle speed or higher. The speed $n_a$ to which the engine is driven may be about 1500 rpm.

Before the predetermined high driven engine speed $n_a$ is reached, the engine speed reaches an ignition activation point $n_z$ at a time $t_2$ when the ignition of the internal combustion engine is activated while the fuel injection remains inactivated. At a somewhat later point in time $t_3$, the speed of the driven end speed $n_a$ where it is maintained until a predetermined injection delay time $t_v$ has passed since the time of ignition activation. As soon as this point in time $t_4 = t_2 + t_v$ has been reached, at which point also the throttle valve flap has been opened to a predetermined start up opening angle $Dk_s$, fuel injection is activated. Then the engine operates under its own power and driving of the engine is terminated. The internal combustion engine reaches the predetermined relatively high driven end speed $n_a$ typically in a few seconds and is maintained at that speed in a driven state again typically for a few seconds before the fuel injection is activated.

The engine 1 is shut down in an essentially reversed order. When the engine 1 is to be shut down, the fuel injection is first deactivated and only after a predetermined switch off delay of 1–2 seconds during which engine speed may be maintained by activating the drive means, the engine 1 is shut down, that is specifically, the ignition is switched off and the engine is permitted to come to a rest. As a result of this measure, the intake duct of the internal combustion engine 1 is brought to a well defined final state from which a renewed start-up procedure as described above can be initiated with very low noxious emissions.

Figure 3:
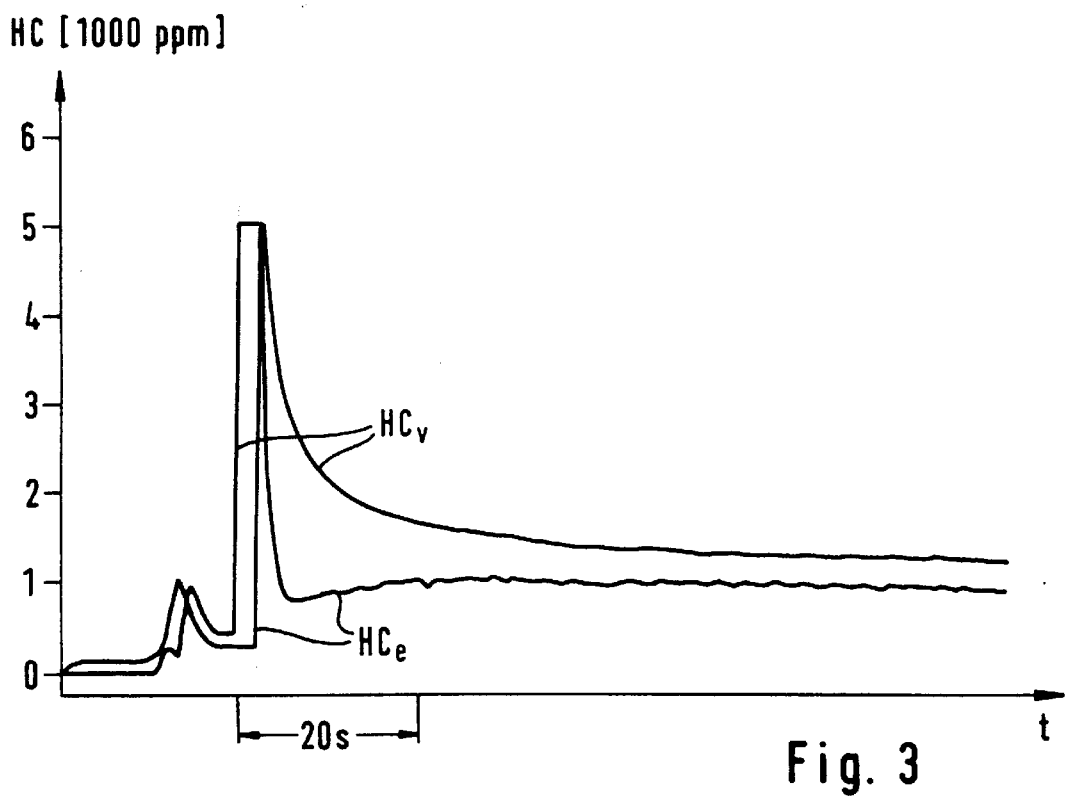
FIG. 3 shows the hydrocarbon raw emissions of an internal combustion engine using the start-up procedure according to the invention in comparison to a normal start-up procedure.

The engine start-up speed which is substantially higher than conventional start up speeds, in combination with the earlier ignition activation and the delayed fuel injection activation, provides already for a relatively low raw noxious emission output directly from the internal combustion engine 1. This is illustrated in FIG. 3 by comparative test measurement curves. Of the two curves, $HC_e$, $HC_v$ shown therein the curve $HC_e$ indicates the HC raw emissions (that is, before treatment of the exhaust gases in a catalytic converter) during engine start-up with the method according to the invention, whereas the other curve $HC_v$ indicates, for comparison, the HC emissions during a start-up of the same engine 1 and also with the same higher driven end speed but without delayed fuel injection activation. In the start-up procedure according to the invention the internal combustion engine was driven to an engine speed of 1500 rpm within 3 seconds and was then driven at this speed for an additional 7 seconds. At that point, the delayed fuel injection was activated whereas ignition was activated already at the beginning of the driven engine speed up. In the comparison example, the engine was driven with deactivated ignition and deactivated fuel injection also within 3 seconds to 1500 rpm and maintained at this speed for an additional 4 seconds whereupon ignition and fuel injection were activated at the same time. It is apparent that, with the start up procedure following the measurement curve $HC_e$, the HC raw emission level is clearly below the emission level obtained in the comparison start-up procedure according to the curve $HC_v$. With the start-up procedure with delayed fuel injection, the top amount of noxious emissions was only 5000 ppm and only for a very short period of time whereas, with the comparison start-up procedure, a top emission value of 15000 ppm was obtained which is not shown in FIG. 3, because the measurement graph reached a stop at 5000 ppm.

Figure 4:
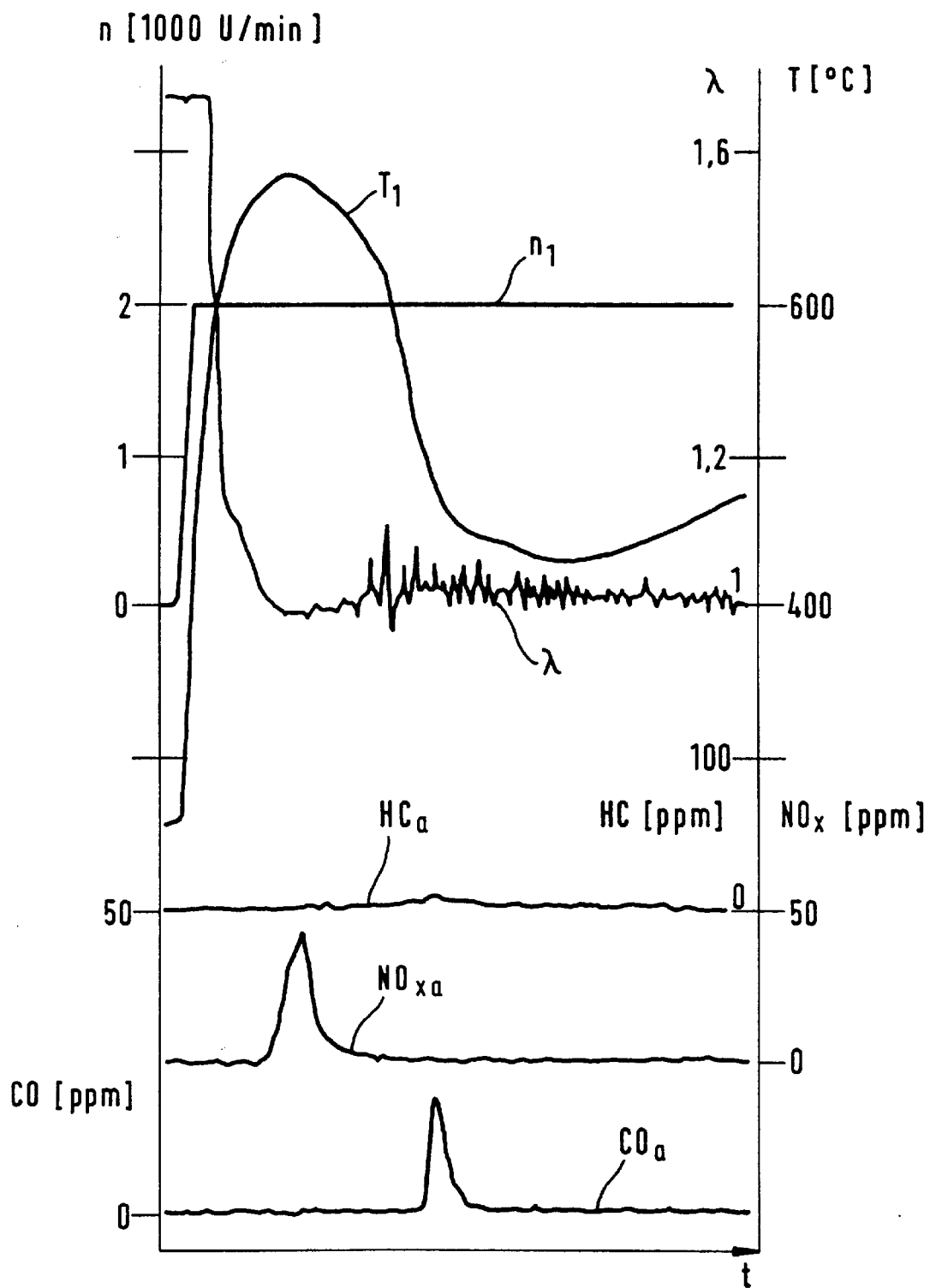
FIG. 4 is a diagram showing measurement values obtained in a FTP75-test during the warm-up phase of an internal combustion engine started in accordance with the method of the invention.

By additionally using the heatable catalytic converter 3, the noxious emissions, which are already relatively low with the start of the engine by driving it first to a higher speed and delaying fuel injection, are further reduced. FIG. 4 shows the results in a first bag of a standardized FTP75 emission test during a warm up operating phase of the internal combustion engine 1 wherein the method according to the invention designed for minimum noxious fuel emissions was utilized as described above. FIG. 4 shows, based on the measured time, the engine rpm $n_1$ of the internal combustion engine, the temperature $T_1$ of the electrically heatable catalytic converter 3, the lambda sensor signal $\lambda$, the HC emissions $HC_a$, the nitrogen oxide emissions $NO_{Xa}$ and the carbon monoxide concentration $CO_a$. As apparent from the self explanatory diagrams of FIG. 4, very low noxious emission levels can be obtained with the method according to the invention particularly during engine warm up.

Obviously, the method according to the invention is not only usable in connection with internal combustion engine plants as they are referred to herein but it is suitable also for reducing noxious emissions in other types of internal combustion engines. It is for example, usable also with power plants without heatable exhaust gas catalytic converters as relatively low emission values during the start-up procedure are obtained already alone by driving the engine to a relatively high speed and by the delay in the fuel injection initiation.

What is claimed is:

1. A method of operating an internal combustion engine for motor vehicles, said internal combustion engine including a fuel injection system and an ignition system, said method comprising the steps of: driving the engine, during an engine start-up procedure, to a predetermined engine activation speed and activating fuel injection only after a delay period of at least one second after activation of the ignition system.

2. A method according to claim 1, wherein said internal combustion engine has an engine idle speed and said predetermined engine speed to which said engine is driven before fuel injection is initiated is at least as high as the engine idle speed.

3. A method according to claim 1, wherein ignition is activated at a point in time when the engine, while being driven, has reached a predetermined ignition activation speed which is below the predetermined engine activation speed.

4. A method according to claim 1, wherein an engine throttle valve controlling air admission to said engine is opened during the engine start-up procedure so that, at the point of fuel injection activation, said throttle valve has a predetermined start-up opening position.

5. A method according to claim 1, wherein said internal combustion engine is part of a hybrid drive unit including an energy storage device, and the engine is driven during the start-up procedure by energy supplied by the energy storage device which energy was earlier generated by the engine and stored in the energy storage device.

6. A method according to claim 1, wherein said engine includes an exhaust system having a heatable exhaust gas catalytic converter and, for each engine start up, said heatable catalytic converter is heated to a predetermined minimum temperature before the engine is driven to said engine activation speed.

7. A method according to claim 1, wherein for each engine shut down first fuel injection is deactivated while the engine is running at least at said engine activation speed and engine operation is shut down only after a predetermined shut down delay time.

* * * * *